United States Patent
Monclus et al.

(10) Patent No.: US 9,531,716 B1
(45) Date of Patent: Dec. 27, 2016

(54) SERVICE ENABLED NETWORK

(75) Inventors: Pere Monclus, San Jose, CA (US); Valentina Alaria, San Francisco, CA (US); Vina Ermagan, San Jose, CA (US); Atul Mahamuni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2012 days.

(21) Appl. No.: 12/537,383

(22) Filed: Aug. 7, 2009

(51) Int. Cl.
| | |
|---|---|
| *G06F 15/16* | (2006.01) |
| *H04L 29/06* | (2006.01) |
| *H04L 12/70* | (2013.01) |
| *H04L 12/24* | (2006.01) |
| *H04L 29/08* | (2006.01) |

(52) U.S. Cl.
CPC ............ *H04L 63/10* (2013.01); *H04L 41/5041* (2013.01); *H04L 47/00* (2013.01); *H04L 41/28* (2013.01); *H04L 67/02* (2013.01); *H04L 67/20* (2013.01)

(58) Field of Classification Search
CPC ...... H04L 41/5051; H04L 67/02; H04L 67/20; H04L 63/10; H04L 63/0272; H04L 63/20; H04L 63/104; H04L 41/5041; H04L 41/28; H04L 47/00; G06F 21/6218; G06F 9/5061; G06F 9/5044
USPC ........ 709/203, 206, 226, 229; 370/230, 352, 370/252, 466, 229, 235; 713/151; 714/2; 726/4

See application file for complete search history.

(56) References Cited

U.S. PATENT DOCUMENTS

| | | | |
|---|---|---|---|
| 6,560,644 B1 | 5/2003 | Lautmann et al. | |
| 6,687,222 B1* | 2/2004 | Albert et al. | 370/230 |
| 6,687,247 B1 | 2/2004 | Wilford et al. | |
| 7,181,436 B1 | 2/2007 | Conley et al. | |
| 7,181,490 B1 | 2/2007 | Harvey et al. | |
| 7,188,155 B2* | 3/2007 | Flurry et al. | 709/219 |
| 7,376,827 B1 | 5/2008 | Jiao | |
| 7,554,909 B2* | 6/2009 | Raghunath et al. | 370/230 |
| 7,558,270 B1 | 7/2009 | Wilford et al. | |
| 7,761,541 B1* | 7/2010 | Morley et al. | 709/223 |
| 7,860,999 B1* | 12/2010 | Subramanian | G06F 9/5044 370/229 |
| 8,069,435 B1* | 11/2011 | Lai | 717/106 |
| 8,122,427 B2* | 2/2012 | Chrysanthakopoulos et al. | 717/104 |
| 8,150,013 B2* | 4/2012 | Buntin et al. | 379/189 |
| 8,156,179 B2* | 4/2012 | Parmar et al. | 709/203 |
| 8,200,749 B2* | 6/2012 | Behrendt et al. | 709/203 |
| 8,223,631 B2* | 7/2012 | Yasrebi et al. | 370/221 |
| 8,370,936 B2* | 2/2013 | Zuk et al. | 726/23 |
| 2004/0131079 A1* | 7/2004 | Hegde | H04L 45/50 370/466 |
| 2004/0243835 A1* | 12/2004 | Terzis | G06F 21/6218 726/3 |
| 2005/0111367 A1* | 5/2005 | Chao et al. | 370/235 |
| 2006/0224883 A1* | 10/2006 | Khosravi | H04L 63/20 713/151 |

(Continued)

*Primary Examiner* — Jungwon Chang
(74) *Attorney, Agent, or Firm* — Polsinelli PC (57) ABSTRACT

In one embodiment, a service enabled network (SEN) controller receives, from a control plane of a network service device, service instructions for corresponding network services. The SEN controller may then distribute the service instructions for the network services to appropriate network access devices within the computer network, such that each of the network access devices may correspondingly implement the network services at their respective data planes, thus providing a distributed implementation of the network service within the computer network.

25 Claims, 8 Drawing Sheets

(56) References Cited

U.S. PATENT DOCUMENTS

2006/0235973 A1* 10/2006 McBride ................. H04L 67/20
709/226
2007/0226299 A1    9/2007 Shaffer et al.
2008/0177896 A1    7/2008 Quinn et al.
2009/0320113 A1* 12/2009 Larsen et al. ..................... 726/7
2010/0251002 A1*  9/2010 Sivasubramanian . G06F 9/5061
714/2
2010/0251339 A1*  9/2010 McAlister ............. H04L 63/104
726/4
2010/0318652 A1* 12/2010 Samba ......................... 709/224

* cited by examiner

SERVICE ENABLED NETWORK

TECHNICAL FIELD

The present disclosure relates generally to computer networks, and, more particularly, to administering network services within computer networks.

BACKGROUND

Network services, such as firewalls, server load balancing, etc., are value-added features that are commonly added to a computer network in the form of specialized appliances. These standalone appliances typically depend on the physical topology of the network and are not a fully integrated solution, have limited scalability, and add unnecessary complexity to network management. In addition, current network design is primarily ad-hoc, generally with no central control and management and no clear boundaries or admission control, often making it difficult to deploy new network services and security policies.

BRIEF DESCRIPTION OF THE DRAWINGS

The advantages of the embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network service device, which is configured to provide one or more network services for traffic in a computer network, transmits service instructions for the network services from its control plane to a service enabled network (SEN) controller (e.g., via an API). The SEN controller manages the service instructions and maintains a topology of network access devices, which are configured to control transmission of traffic between the computer network and devices attached to the network access devices. The SEN controller may then distribute the service instructions for the network services to the network access devices (e.g., via another API on the network access devices). Each of the network access devices may correspondingly implement the network services at their respective data planes, thus providing a distributed implementation of the network service.

DESCRIPTION

A computer network is generally a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router or switch, to extend the effective "size" of each network. An enterprise network is a type of network that, as will be understood by those skilled in the art, has qualities of both a LAN and a WAN, interconnecting a single enterprise (LAN-like) over large distances (WAN-like).

Figure 1:
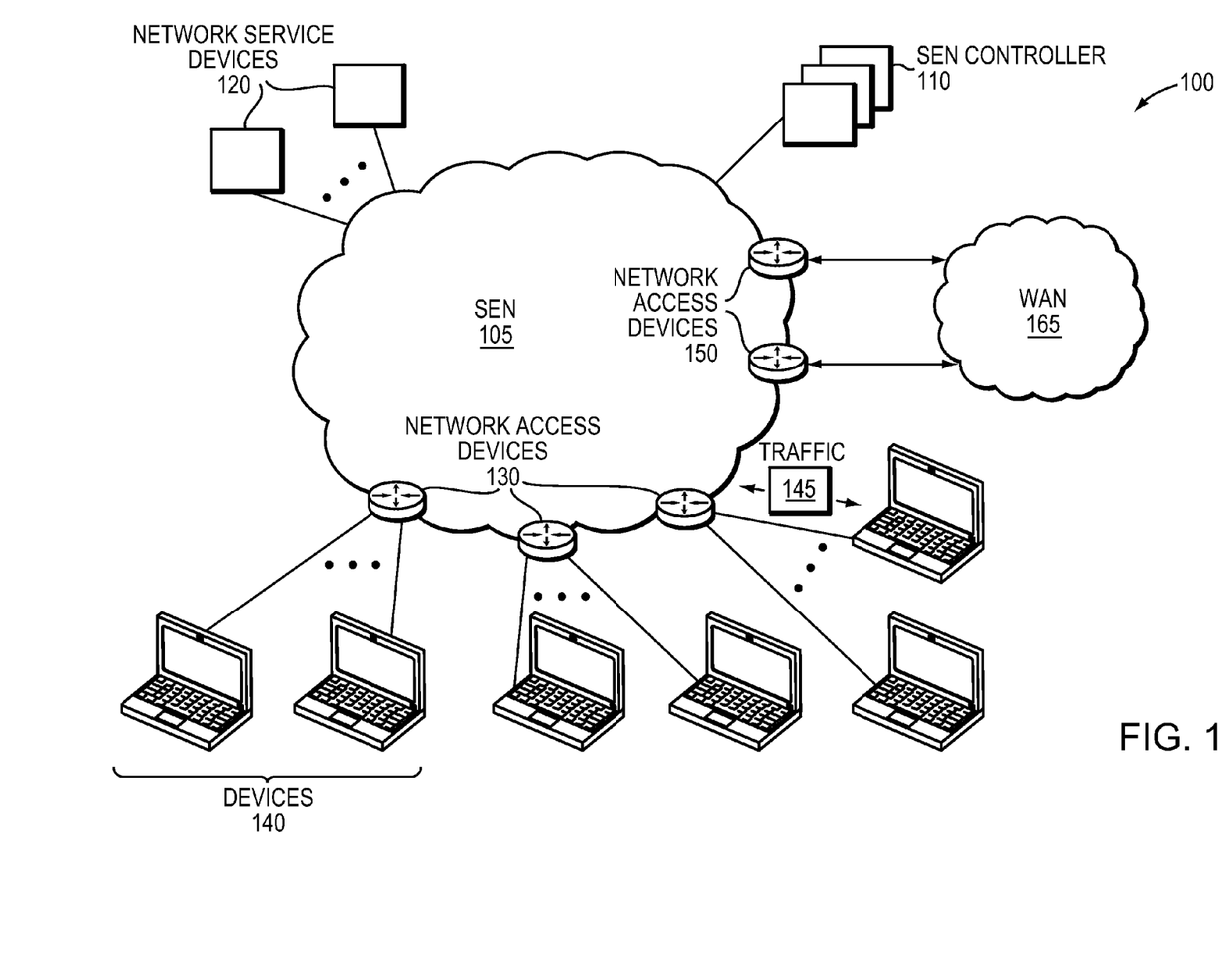
FIG. 1 illustrates an example computer network.

FIG. 1 is a schematic block diagram of an example computer network 100 illustratively comprising nodes/devices, such as a "SEN controller" 110, one or more network service devices 120, one or more network access devices 130 interconnected with attached devices 140 (e.g., computers, workstations, end stations, etc.), and one or more network access devices 150 interconnecting the service enabled network (SEN) 105 (e.g., a LAN or part of an enterprise network) with the WAN 165. Those skilled in the art will understand that any number of nodes, devices, links, etc. may be used in the computer network, and that the view shown herein is for simplicity. Also, data packets 145 (e.g., traffic) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2A:
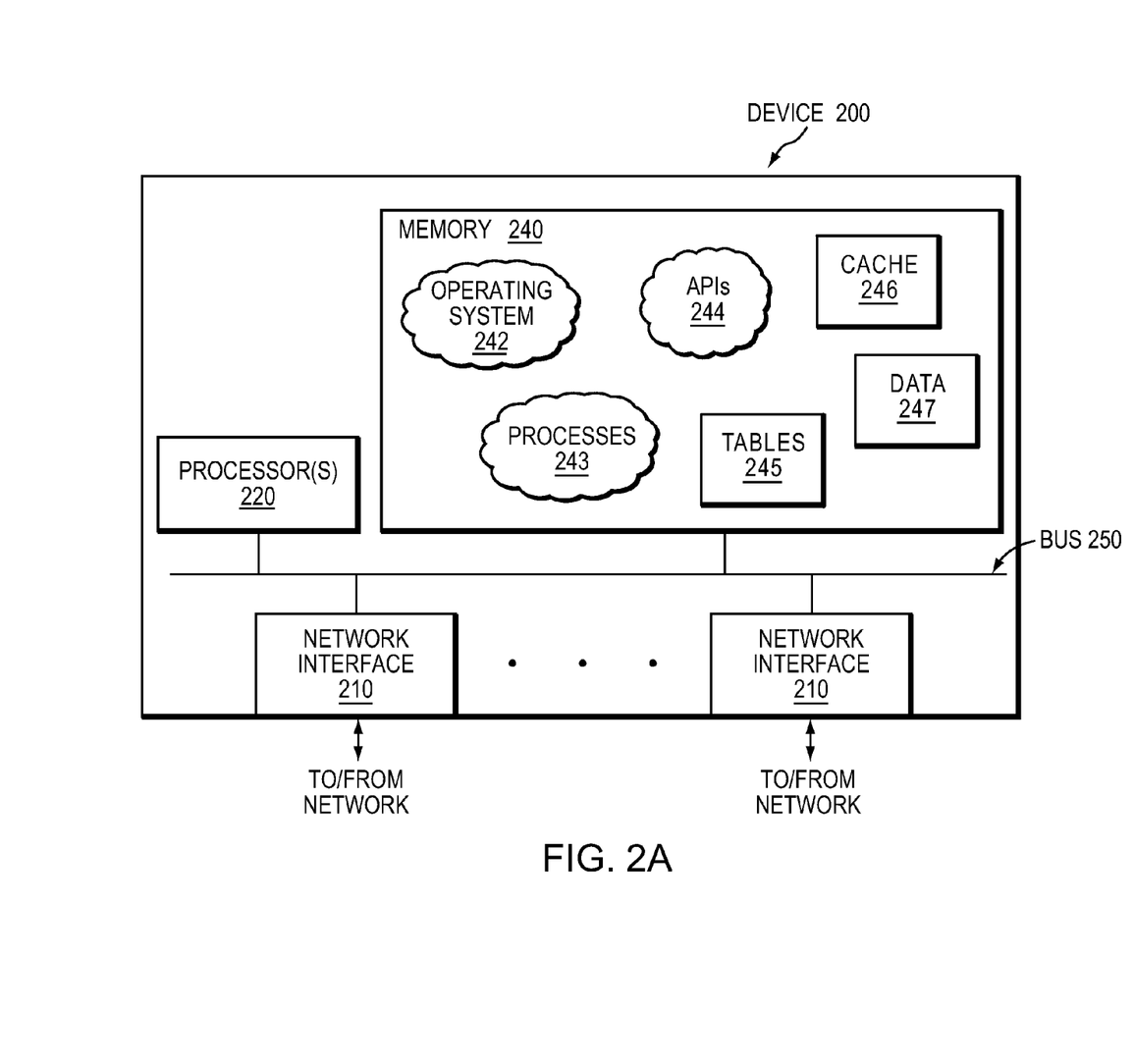
FIGS. 2A-B illustrate alternative example views of a network device/node.

FIG. 2A is a schematic block diagram of an example node/device 200 that may be advantageously used with one or more embodiments described herein, such as a service device 120, access device 130/150, or SEN controller 110. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures. An operating system 242 (e.g., the Internetworking Operating System, or IOS™, of Cisco Systems, Inc., or any other suitable operating system), portions of which are typically resident in memory 240 and executed by the processor(s), functionally organizes the node by, inter alia, invoking network operations in support of software processes/modules executing on the device. Generically, memory 240 may comprise various processes 243, application programming interfaces (APIs) 244, tables 245, cache entries 246, data 247, etc. It will be apparent to those skilled in the art that other types of processors and memory, including various computer-readable media, may be used to store and execute program instructions pertaining to the inventive techniques described herein.

As an example, for access devices such as routers, a routing process may contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers using routing protocols, such as the conventional OSPF and IS-IS link-state protocols (e.g., to "converge" to an identical view of the network topology).

Figure 2B:
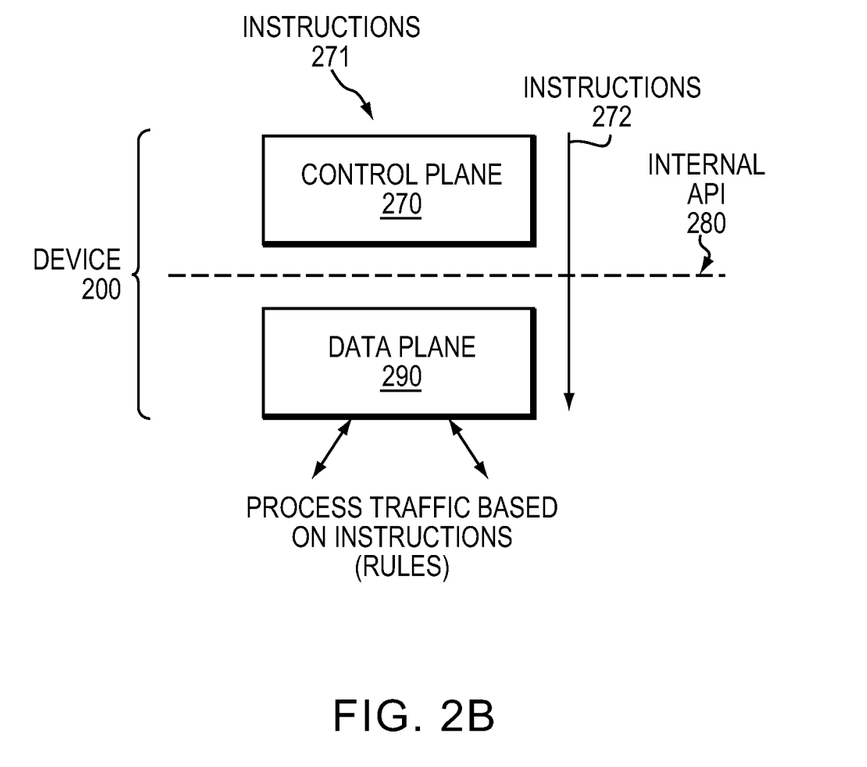

FIG. 2B is a schematic block diagram of an alternative view of the example node/device 200 that may be advantageously used with one or more embodiments described herein. In particular, in addition to having network interfaces 210, processors 220, and a memory 240, the device may be viewed logically as a control plane 270 and a data plane 290 interconnected via an application programming interface (API) 280 (e.g., 244). Generally, as may be appreciated by those skilled in the art, the control plane 270 is comprised of portions of the device (e.g., switch, router, service device, etc.) that are configured to control overall operation of the device. For instance, the control plane 270 of a network access device may be concerned with maintaining network topology (e.g., participating in routing protocols), quality of service (QoS) features, etc. The control plane 270 of a network service device, on the other hand, may be concerned with configuration of a particular service, such as firewall rules, intrusion detection techniques, etc.

The data plane 290 (or forwarding plane or data path) defines the part of the device 200 that controls the handling of traffic/packets arriving on an inbound interface (e.g., routing and/or forwarding). For instance, the data plane may decide to forward the traffic on a particular outbound interface, drop the traffic, maintain time-to-live (TTL) functionality, etc. Generally, the passage from an input interface directly to an output interface (or dropped), through the data plane with minimum modification, is called a "fast path" of the device. If the packet needs significant processing, such as segmentation (or for a service device, performing a particular service), the traffic may use a "slow path" of the device traversing the control plane 270 for further processing (sometimes called a specific "services plane," though included herein generically within the control plane).

Communication between the control plane 270 and data plane 290 may be accomplished through the use of an application programming interface (API) 280. Specifically, an API in an interface that defines the ways by which an application program (process, module, etc.) may interact with other entities, such as libraries or the operating system 242. For instance, an API determines the conventions to employ, such as for routines, data structure access, protocols, etc., used to communicate from the requesting processes/modules (e.g., remote procedure calls). That is, an API specifies an interface and controls the behavior of the objects specified in that interface.

As per the example shown in FIG. 2B, assume further that the device shown is a network service device 120, such as a firewall. The control plane 270 of the firewall may receive a set of rules 271 (e.g., from an administrator), which may be converted into instructions 272 and transmitted by the internal API 280 for use by the data plane 290 in implementing the rules (e.g., dropping packets to/from particular network addresses). The data plane 290 may then implement the rules during the processing of packets (e.g., the fast path) or may relay packets to the control plane (e.g., service plane) on the slow path for in-depth processing (e.g., behavioral monitoring, etc.).

Typically, network service devices are placed in-line of a data path in order to have their services rendered. For instance, a firewall would generally be placed at the entrance or exit of a LAN in order to control traffic flowing into and out of the particular LAN. The same would apply to server load balancers (SLBs), being placed between end users and the servers in order to direct the client-server traffic accordingly. A relatively recent movement in networks is to remove the necessity of having network service devices be located in-line of the data path. In particular, the Service Insertion Architecture (SIA) provides an architecture for creating service chains via traffic tagging and tunneling. That is, SIA enables the tunneling of traffic to an appropriate network service device (e.g., based on a service tag) in order to decouple enforcement of services from their physical location in the network, thus moving packet transmission from a physical topology to a logical topology.

Specifically, an illustrative SIA network provides a platform independent, consistent architecture for adding high touch services to a network without requiring topology changes. This architecture has several components. First, service nodes and service clients may "register" with a "service directory/broker" (SDB), which is configured to store and provide a consistent domain-wide view of available services. For instance, a service node may register with the SDB that it is able to provide firewall services for the network, while a service client may register with the SDB that it desires firewall services. In response, the SDB returns a "service header" to each of the service node and service client that is specific to the registered service. According to a second component of the architecture, traffic (packets) is redirected with a prepended service header from service clients to an appropriate service node in the network, independent of physical location, such that the service node may perform the services as requested by the service header (e.g., firewalling). In this manner, service clients need not perform the services desired/required by the traffic, but may instead redirect the traffic to service nodes within the network that are specifically configured to provide such services. The traffic may then be forwarded from the service nodes toward its destination after the services have been performed.

While SIA has proven to be a useful network architecture, in its current form SIA does not scale well with increased use of network services. In particular, while SIA may ease the configuration burden of a network (e.g., offloading the placement and configuration of network services to a topology-independent service node), it does not ease the data path load on the service node itself. In other words, due to distributed service clients sending their service-oriented traffic to the service nodes for processing, the service nodes themselves may become overburdened, creating a bottleneck in the network. Additionally, as noted above, current network design is primarily ad-hoc, generally with no central control and management and no clear boundaries or admission control, also limiting the capability for straightforward traffic measurements.

Service Enabled Network (SEN)

According to one or more embodiments herein, a SEN provides an infrastructure through which network elements (switches, routers, bridges, hubs, service devices, etc.) can expose their service features and capabilities through a set of APIs. In particular, as described below, a central SEN controller 110 abstracts the complexity of the interrelated network elements and the network topology changes, and exposes these resources through abstract unified network-level APIs. In this manner, network service devices 120 can register with the SEN controller and leverage these APIs to expand and distribute their data path (data plane) instructions to the capable network access devices 130/150. SEN thus hides the churn and complexity of topology changes from the network service devices by caching the instructions and updating a newly joined access device with the up-to-date configuration. Accordingly, a SEN network goes beyond the basic transport of packets, and may be configured to recognize, monitor, scale, protect, and accelerate applications, blending services and networking as a single distributed (and reusable/updateable) infrastructure with well defined interfaces/boundaries.

At a basic level, then, a SEN comprises: i) a SEN controller; ii) a control plane for a network service device configured to provide one or more network services for traffic in the computer network and to receive service instructions for the network services; iii) a data plane for each of one or more network access devices configured to control transmission of traffic between the computer network and devices attached to the computer network via the network access devices; and iv) a way to distribute the service instructions for the network services from the control plane to the one or more data planes via the SEN controller for distributed implementation of the network services of the network service device control plane at the one or more data planes of the one or more network access devices.

Figure 3A:
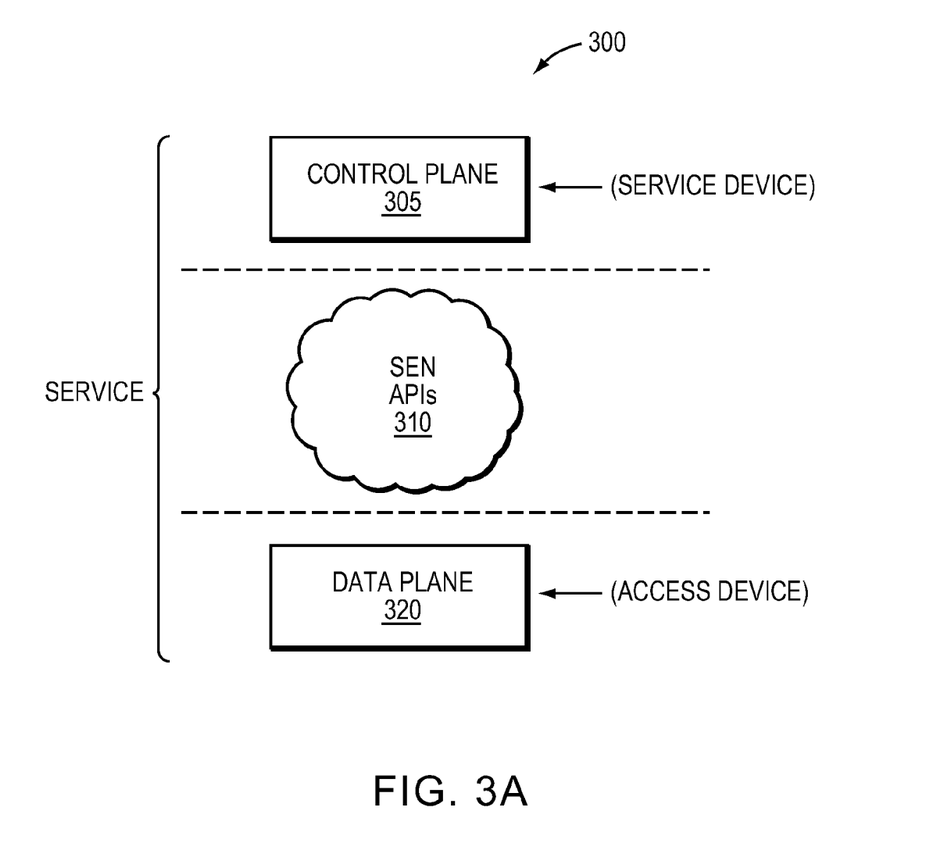
FIGS. 3A-B illustrate an example service enabled network (SEN) environment.
Figure 3B:
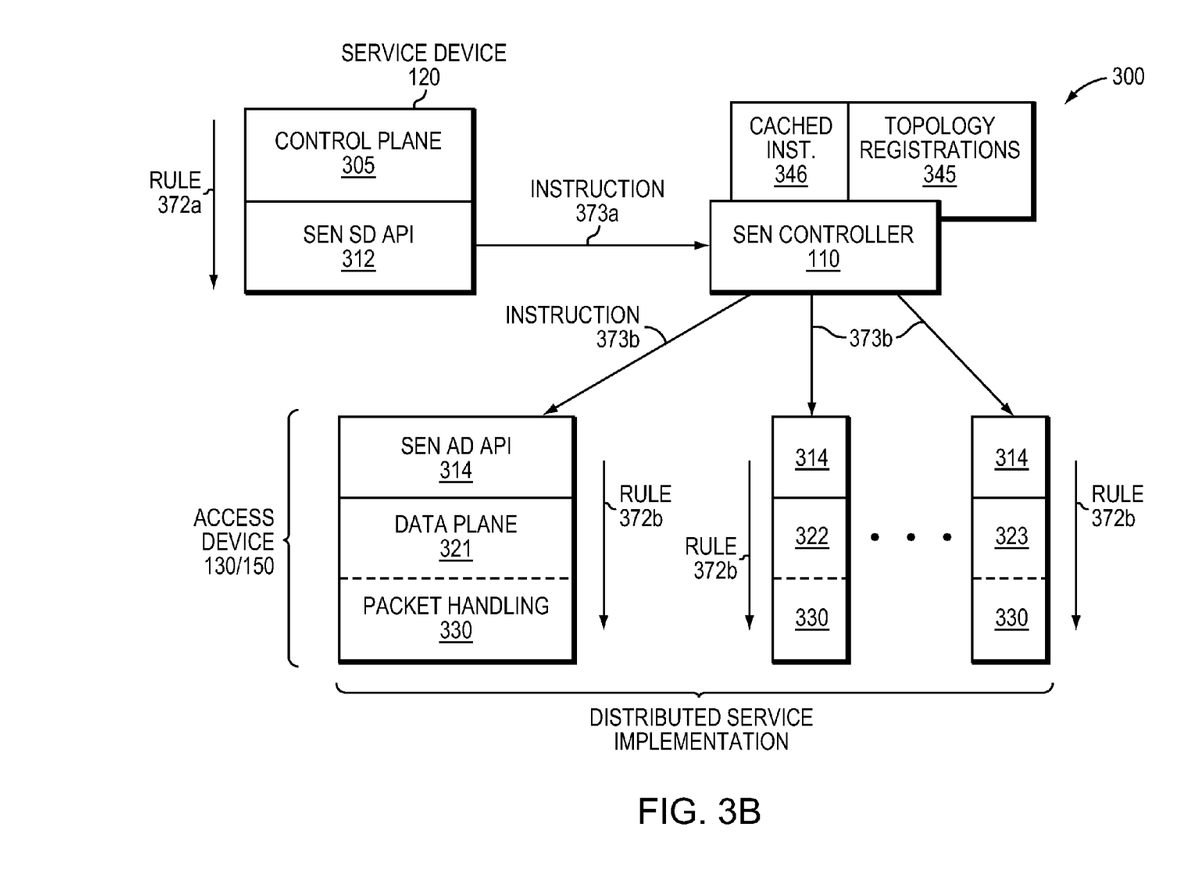

A visual explanation of this may be found in FIGS. 3A-3B, which each illustrate an example logical view of a SEN network. First, however, returning to FIG. 2B, recall the arrangement of the example firewall, having a control plane 270 and data plane 290 interconnected via an internal API 280. Referring now to FIG. 3A, the control plane (now 305) of a network service (such as the firewall) is separated from the data plane (now 320) via an externalized SEN API 310. As such, SEN separates the service device's data plane 320 (e.g., the packet handling, topology-oriented portion) from its control plane 305 (e.g., the service management portion). In other words, Service Enabled Networks introduce a service platform that provides a unified infrastructure on which to run network services by abstracting the platform and topology specific aspects away from the service applications (devices 120) in order to decouple the service development from network infrastructure management. As shown in FIG. 3B below, now that the control and data planes have been separated by the SEN APIs 310 (e.g., and the SEN 105 itself), the services provided by the single network service device 120 may be distributed throughout the SEN.

While network access devices, such as switches and routers, provide the channel over which communication may take place, network service devices are enabled to add value in various levels of the communication. For instance, various packet processing functions may be capable of inspecting, transforming, and taking actions based on information carried on or across packets, flows, sessions, etc. at any appropriate network layer (Layer-2 through Layer-7, "L2-L7" based on the known OSI model, i.e., a data link layer (L2), a network layer (L3), a transport layer (L4), a session layer (L5), a presentation layer (L6), or an application layer (L7)). For example, various security based services and virtualization based services may be performed upon traffic as it flows through the network, such as in accordance with a particular service type (e.g., flow through or store and forward) and a particular integration mode (e.g., routed mode, transparent, or promiscuous). Illustrative services include, but are not limited to: firewall (FW) services; intrusion detection services (IDS); intrusion prevention (or protection) services (IPS); distributed measurement services; access control list (ACL) services; identity-based access services; server load balancing (SLB) services; file system virtualization (FSV) services; wide area application services (WAAS); content scan services; signature-based services; and anomaly detection services (each as will be understood by those skilled in the art).

Continuing the visual in detail with reference to FIG. 3B, each network service device 120, which may simply consist of a framework (e.g., software, OS, etc.) that executes on standard PC platforms, comprises a control plane 305 that is configured to receive and manage service instructions (or "rules") 372a for the network services provided by the particular device 120. For instance, one device may provide firewall services, another load balancing services, etc. These service instructions may then be passed to a SEN service device (SD) API 312 that is configured to transmit the service instructions for the network services to the SEN controller 110 (as instructions 373a). Notably, in certain scenarios, such as where the service instructions are proprietary, nonstandard, or otherwise, the SD API may also be configured to convert the service instructions to raw feature instructions prior to service instruction transmission to the SEN controller (e.g., to a raw feature instruction format used within the SEN 105 and/or by the SEN controller 110, as may be appreciated by those skilled in the art).

The central SEN controller itself acts as a registry point for both network service devices and network access devices (e.g., switches/routers). It keeps a registry of these elements and their topological attributes, and a list of their data-plane processing capabilities/features. It also monitors their liveness status. Network service devices 120 may "register" with SEN controller, such that the SEN controller receives the corresponding service instructions for a particular network service to be applied to traffic in the SEN computer network. In this manner, the network service devices 120 may leverage the unified network-level APIs to offload and distribute a portion of their functionalities (instructions) to the network access devices throughout the network (e.g., at the network perimeter, described below).

The SEN controller 110 is responsible for distributing the service instructions to the appropriate network access nodes. Accordingly, the controller effectively "hides" the complexity of topology changes from the network service devices 120, since the network service devices are removed from the underlying topology via the SEN controller. Specifically, the SEN controller 110 may cache the full configuration instructions (rules) in a storage location 346 along with a stored topology of the SEN 105 (e.g., a database of registered access devices, described below) at location 345 (e.g., in a memory 240).

Once the SEN controller determines a set of network access devices 130/150 that are able to implement (and interested in implementing) a particular set of network services, the SEN controller may distribute the service instructions (373*b*) to those network access devices for distributed implementation of the network services. Illustratively, an API 314 of the access device is configured to communicate a registration with the SEN controller 110, where the registrations has an indication of network service capabilities (and desires) of the data plane of the access device. As such, the SEN controller may receive these registrations and may determine the one or more network access devices to which the service instructions should be distributed (e.g., multicast).

The network access devices 130/150, as they are referred to herein, generally comprise one or more network interfaces that are configured to allow access to the SEN computer network for one or more attached devices, such as computers, workstations, end stations, or, in the case of devices 150, network devices from other networks (e.g., WAN 165). In particular, in accordance with one or more embodiments herein, a service enabled perimeter of the SEN computer network 105 is defined by the network access devices. In other words, the SEN 105 may be divided between a core (not shown) of network switching/routing devices and a perimeter of network access devices 130/150 that have services enabled thereon. Accordingly, the services are distributed among (pushed to) the edge devices (access devices or perimeter switches/routers) of a network, such that policies may be implemented to control traffic entering and exiting the SEN at its perimeter.

The network access devices 130/150 each have a corresponding SEN access device (AD) API 314 to receive the service instructions 373*b* from the SEN controller 110, and to transmit those instructions (rules 372*b*) to the corresponding data plane of the access device (e.g., 321, 322, 323, etc., "32X" herein). Specifically, the SEN AD API is configured to configure the data plane 32X to implement the network services on the traffic as directed by the service instructions (which, as noted above, may first need to be translated into appropriately phrased "rules" for the data plane). The data plane 32X, which is generally configured to control transmission of traffic between the attached devices 140 and the SEN computer network 105 (over network interfaces 210, and in conjunction with illustratively separated packed handling portion 330), may then implement the network services as directed by the service instructions on traffic passing therethrough. Notably, added support may be configured for the services into the data planes 32X (e.g., and into the network infrastructure) to be able to control certain features appropriately, such as flow redirection, application classification, flexible header parsing, L7 inspection, flexible rewrites, etc., as may be appreciated by those skilled in the art.

Notably, the SEN controller 110 (as well as the network service devices 120) may be configured to classify network access devices 130/150 into groups. For instance, groups may be based on service capabilities, topological attributes, or other attribute (e.g., discovered through registration of the network access devices or otherwise). For instance, network access devices 130 may be a first group of devices based on topology (e.g., access to user devices), while devices 150 may be another group (e.g., access to WAN 165). The SEN controller may store the classifications (e.g., at registration time), and then the SEN controller or network service devices may specify a target group of network access devices to receive certain service instructions. For instance, a firewall may have different rules for access devices 130 than for devices 150, but may also have rules for both groups (e.g., a universal group, or a group in which both devices 130 and 150 belong, etc.).

As the difference between FIG. 3A and FIG. 3B illustrate, by abstracting the data planes from the control plane of a network service (via SEN controller 110), the implementation of the network service may be distributed to a plurality of access devices (e.g., perimeter devices). Previously, each network service (e.g., firewall) was required to be placed strategically within the network in the data path, typically at the edge devices 150 connecting the LAN to a WAN 165. Now, however, each and every access point to the SEN may be protected with the illustrative firewall, and only one firewall control plane would be needed. In other words, SEN takes N data planes, and extracts those N data planes into a single data plane abstraction (via SEN controller 110) for communication with the service control plane (that is, there are not N service devices, but instead only one service device having its service implemented on N access devices' data planes).

It is through this abstraction that the SEN controller separates the service aspects of the network from the topology aspects. Particularly, through the use of registrations, which could indicate topology changes (e.g., new access devices) service instruction updates (e.g., where an administrator changes a rule on a service device or where a new service is added to a network), heartbeats (e.g., a maintained keepalive protocol between the SEN controller and each of the network service device and the one or more network access devices), and other means for failure or disabling notifications (e.g., removing a service device from the network, and its associated service, an option), the SEN computer network dynamically adjusts the implementation of a service based on the topology of the SEN, without the service device needing to maintain an interest in the topology. Previous networks would be required to configure a service on each desired interface, such that in the event one of those interfaces failed and another took its place, the service would have to be configured on that new interface as well (e.g., manually). With SEN, however, the new interface (of an access device) would register with the SEN controller, and would receive the (cached) up-to-date service instructions, as necessary.

Accordingly, SEN provides an infrastructure through which the network access devices can expose available features (e.g., flow tables, traffic classification, grammar, measurements, etc.) as common resources of the network infrastructure through a set of APIs for network service devices (e.g., firewalls, Intrusion prevention, load balancing, etc.) to access the exposed resources. Network service devices can then distribute their data plane over the collection of access devices (e.g., perimeter switches/routers) while they maintain their own central control plane. Note, however, that in certain embodiments, network services may be classified as fast path services or slow path services, as noted above. In such situations, the network service devices may still comprise a suitably configured data plane to receive traffic requiring slow path services from a network access device for performance of the corresponding slow path service (e.g., those for which the access device is not capable of implementing, or that require the actual service device to handle). For example, a fast path service may be to simply count packets at each access device interface, but a slow path service may be to generate traffic flow measurements and trend data based on the packet counts of hundreds of access device interfaces within the SEN 105.

By offloading the fast path operations to the network access devices, network services can exploit a vast number of processing units (network elements) for the common and less complex operations while retaining the sophisticated functionalities of the services on the standard platform for the service where deployment can be more efficient. This hybrid model provides high flexibility and extreme scalability for the services, while still hiding the complexity of managing each device individually, thus enabling services to view the network as a single platform. In addition, the hybrid nature of this arrangement allows SEN to be integrated with existing SIA networks. While SIA aims at creating service chains via tunneling, SEN allows services to extend and distribute their data path to the edge devices, achieving a highly scalable hybrid model. SIA infrastructure can leverage the SEN platform to let the service nodes offload their instructions to the network access devices, while SEN hides the churn and complexity of network topology changes and provides an abstract API with a logical network-level view to the services. Leveraging this API, an eco-system of established services as well as new and value-added services can be built by industry partners, being readily compatible with existing products in the network.

Figure 4:
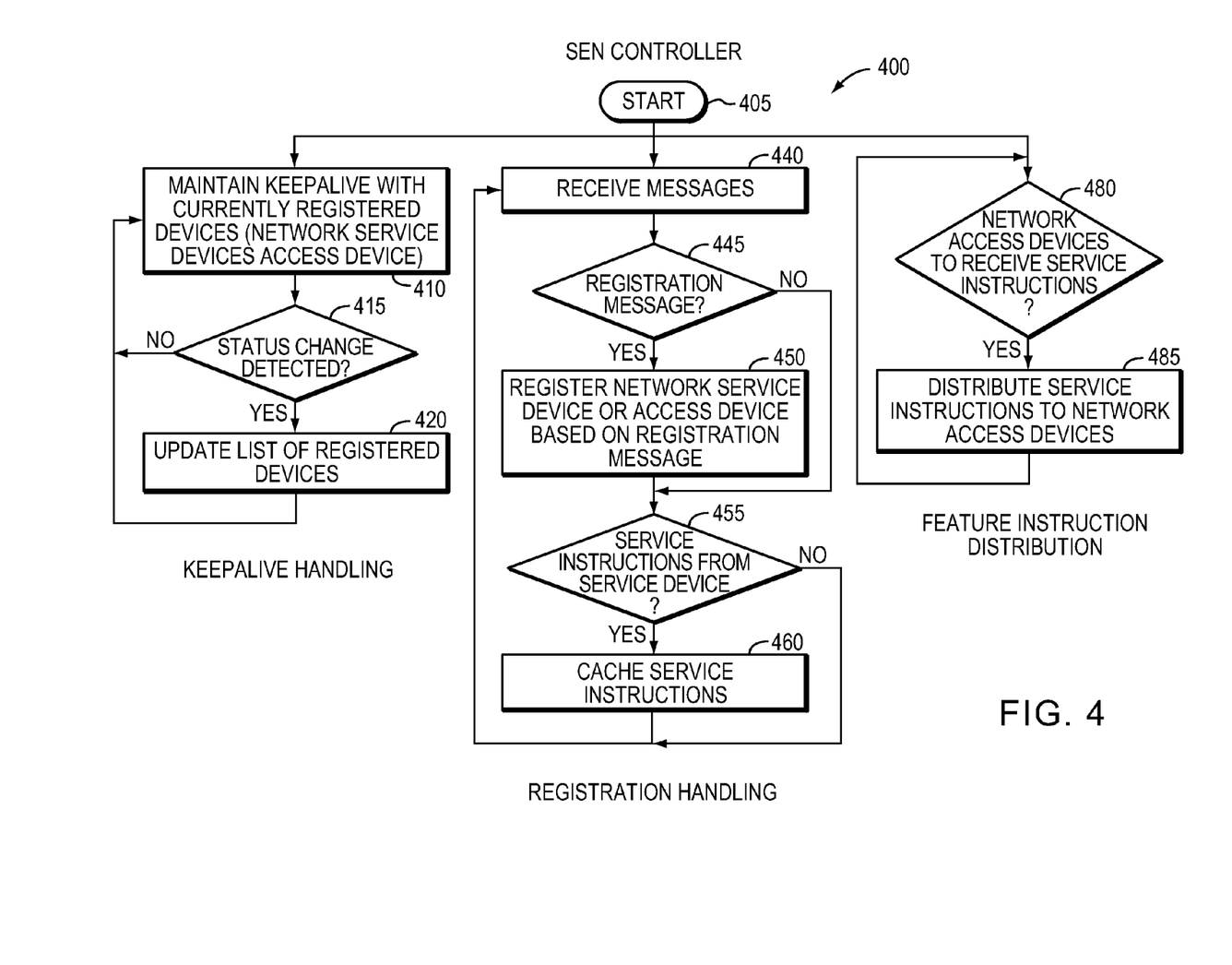
FIG. 4 illustrates an example procedure for implementing a SEN from the perspective of a SEN controller.
Figure 5:
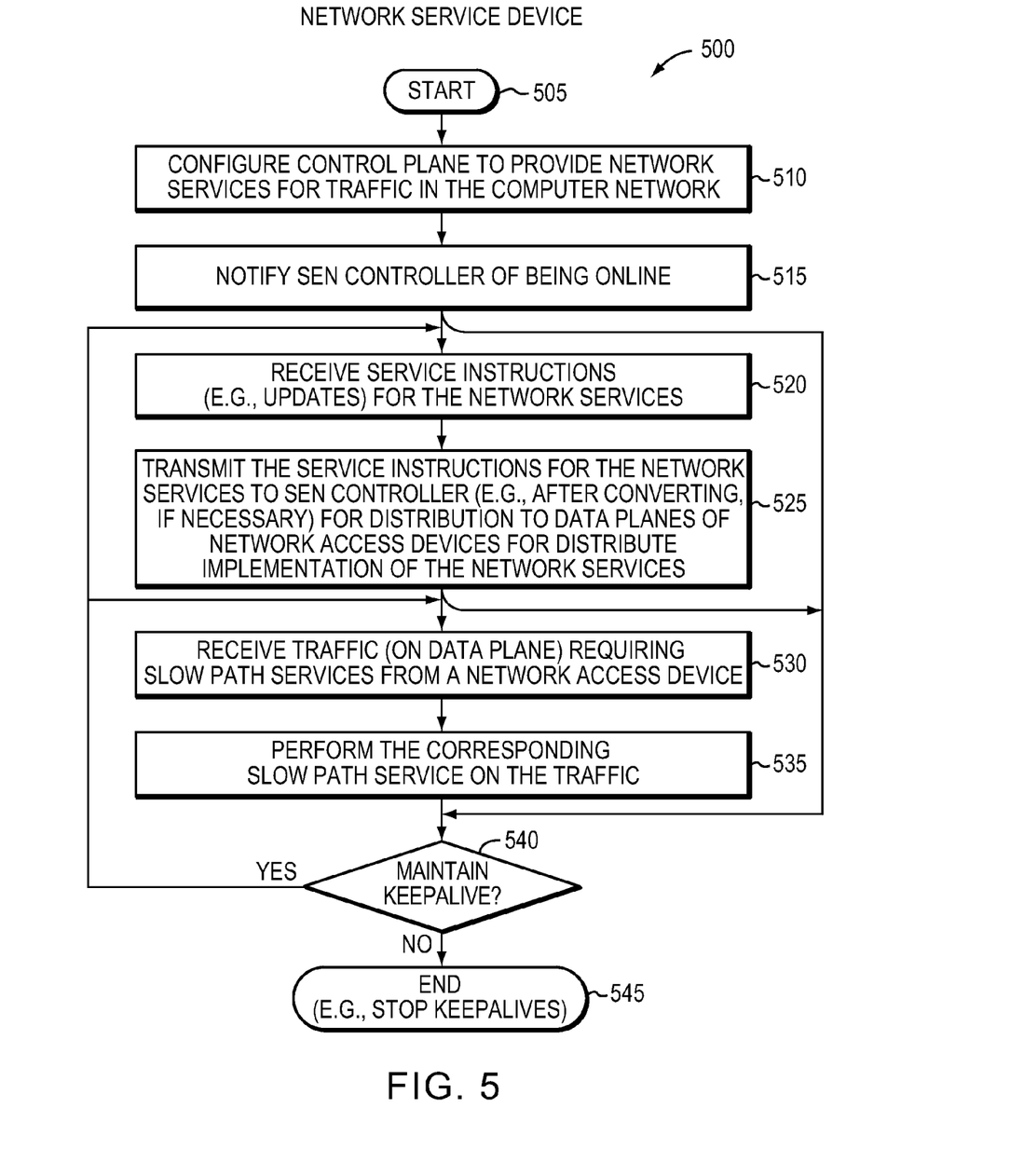
FIG. 5 illustrates an example procedure for implementing a SEN from the perspective of a network service device.
Figure 6:
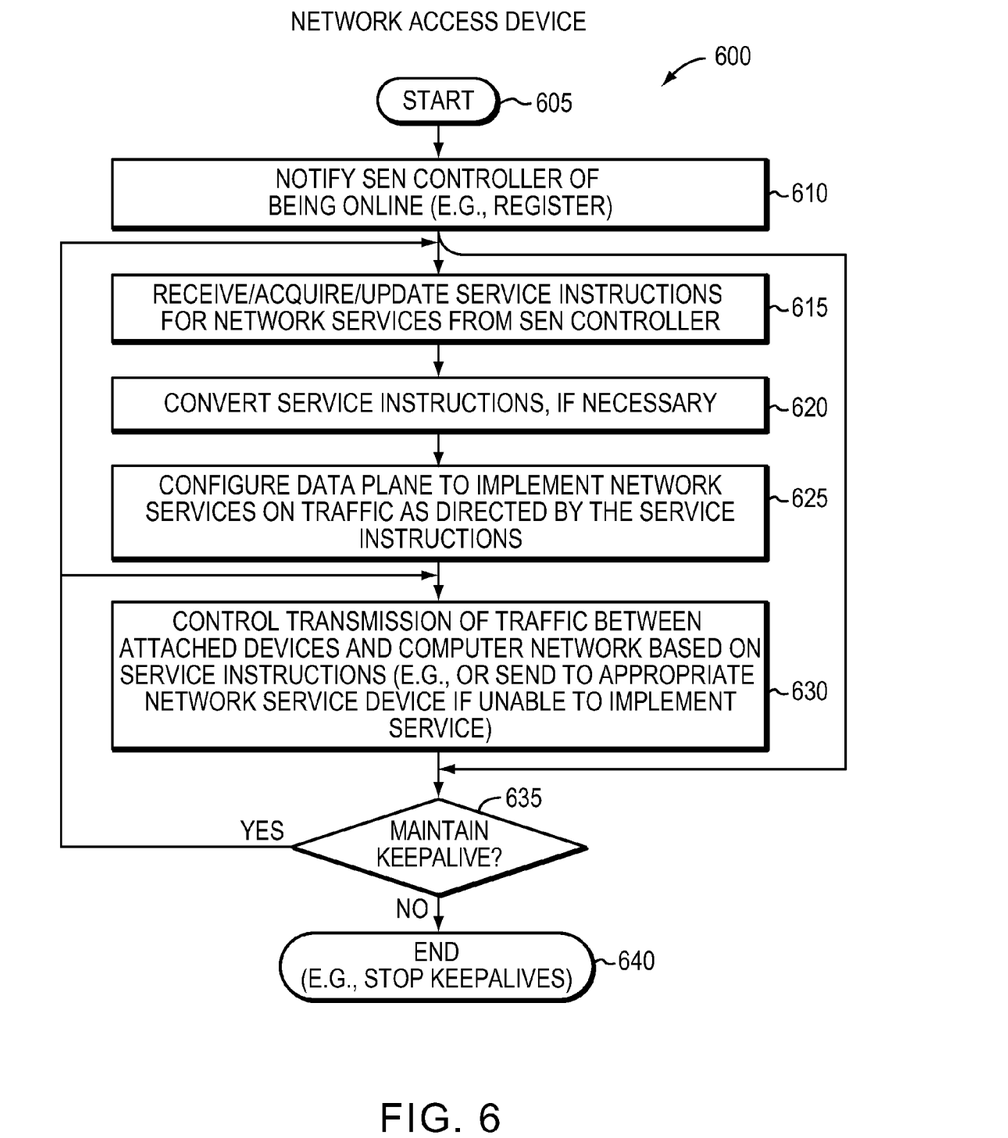
FIG. 6 illustrates an example procedure for implementing a SEN from the perspective of a network access device.

FIGS. 4-6 briefly summarize certain concepts of one or more embodiments described above. In particular, FIG. 4 illustrates a simplified example procedure for implementing a SEN from the perspective of a SEN controller in accordance with one or more embodiments described herein. The procedure 400 starts at step 405, and may continue simultaneously to steps 410, 440 and 480. As an example, these simultaneous parallel executions may be implemented as separate threads or processes in an operating system 242. In step 410, SEN controller maintains a keepalive protocol with devices that are currently registered with the SEN controller. This includes both the network service devices 120 and network access devices 130/150. If the keepalive has detected any status change in step 415, the procedure continues to step 420 where the SEN updates the list of registered devices. The procedure may then return to step 410 to maintain the keepalive protocol active with registered devices.

In step 440, the SEN controller 110 may also receive messages from either network service devices 120 or network access devices 130/150. In step 445, the SEN controller checks (determines) whether the received message is a registration message. If the message is a registration message, then the SEN controller updates the registration tables in step 450. Alternately, at step 455, if the received message is determined to be a service instruction 373a from a network service device 120, then the SEN controller updates its cache of service instructions in step 460.

In step 480, the SEN controller 110 consults its databases of registered devices and the cache of service/feature instructions updated in steps 420 and 460 to see if there are any network access devices 130/150 that need to receive service instructions 373b. If it is determined that the service instructions 373b need to be distributed to network access devices 130/150, then the SEN controller moves to step 485 in which it distributes (e.g. multicasts) service instruction 373b to network access devices 130/150, illustratively hiding network topology changes (e.g., of the access devices or otherwise) from the network service devices, as described above. The procedure 400 continues until the SEN controller is disabled, at which point the network access devices are not able to receive new service instructions, but can still operate and apply the previously added service instructions to the network traffic.

Conversely, FIG. 5 illustrates a simplified example procedure for implementing a SEN from the perspective of a network service device in accordance with one or more embodiments described herein. The procedure 500 starts at step 505, and continues to step 510, where the control plane 305 of the network service device 120 is configured to provide network services for traffic in the computer network, such as by an administrator or manufacturer. In step 515 the network service device 120 may notify the SEN controller 110 of being online (e.g., by registering, initiating a keepalive protocol, simply allowing itself to be discovered, etc.). At this point the service device 120 may be required to maintain a keepalive protocol (go to step 540) between itself and the SEN controller 110 (thus, in essence, executing in parallel to the rest of the procedure). In step 520, the device 120 may receive service instructions (e.g., new instructions or updated instructions) for the network services under the direction of the control plane 305. In step 525, the network service device (e.g., the SD-API 312) may transmit the service instructions 373a for the network services to the SEN controller 110 for distribution to data planes 32X of network access devices 130/150 for distributed implementation of the network services as described herein. Note that, as mentioned above, the SD-API 312 may first convert the service instructions, if necessary, in step 525.

Optionally, in step 530, according to certain implementations of the SEN, the network service device 120 may receive traffic (on its data plane) that requires network service (e.g., slow path services) from a network access device. If so, then in step 535, the network service device may perform the corresponding (slow path) service on the traffic, prior to forwarding the traffic toward its destination, as described above.

Regardless, in step 540, the service device 120 may be required to maintain a keepalive protocol between itself and the SEN controller 110, such that upon ceasing the keepalives (e.g., purposefully or in response to a failure), then in step 545 the procedure 500 ends for that network service device. Notably, the SEN controller may be configured to either remove the disabled service device's instructions from its storage, or even from the network access devices that have received them, or may maintain the instructions (e.g., until told otherwise) in order to maintain functionality of the data plane based implementation of the network services. On the other hand, should the network service device maintain the keepalive protocol in step 540, then the procedure 500 may return (if necessary) to either step 530 to receive incoming traffic for processing, or simply to 520 in the event new/updated instructions are received.

Finally, FIG. 6 illustrates a simplified example procedure for implementing a SEN from the perspective of a network access device in accordance with one or more embodiments described herein. The procedure 600 starts at step 605, and continues to step 610, where the network access device 130/150 may notify the SEN controller 110 of being online (e.g., by registering, initiating a keepalive protocol, simply allowing itself to be discovered, etc.). At this point a keepalive protocol starts with the SEN controller (go to step 635), which runs in parallel with the rest of the procedure. In time, at step 615, the access device may receive/acquire service instructions 373b for one or more particular network services from the SEN controller (e.g., by AD-API 314), as described above (e.g., and may need to convert the instructions in step 620, also described above).

In step 625, the data plane 32X of the access device may be configured to implement the network services on traffic as directed by the service instructions, such that in step 630, the access device may control transmission of traffic between attached devices 140 (or WAN 165) and the SEN (computer network 105) based on those service instructions. (Alternatively, as mentioned herein, the access device may also send the traffic to an appropriate network service device if unable to implement a required service itself.) So long as the keepalives are maintained in step 635, then the procedure may continue to control the traffic in step 630, or may return to step 615 to receive updated service instructions for implementation. Otherwise, the access device may stop sending keepalives in step 640 (e.g., purposefully or due to failure), and the procedure 600 ends for that access device. Notably, as mentioned herein, should another access device take its place, or should the disabled access device return to service, then an updated set of service instructions may be received from the SEN controller (steps 610/615), accordingly.

Advantageously, the novel techniques described herein provide the framework for what is referred to herein as a "service enabled network" or "SEN." In particular, the novel techniques described above introduce a level of network abstraction (e.g., an abstracted API) that effectively hides the complexity of managing individual, potentially heterogeneous devices and changes in the network topology, and enables services to view the network as a single platform. SEN can hide the complexity of managing individual heterogeneous devices by exporting a unified abstract API to network service devices, while performing the necessary transformations to map the abstract API to individual network access devices. SEN hides the complexity of topology changes from the network service devices by maintaining (caching) the network configuration, as well as by updating a newly joined access device with the most updated configuration. By providing centralized management for automatic discovery, monitoring, and managing of the properties of the boundary (edge/perimeter), SEN minimizes the infrastructure work required to introduce new network services into the computer network.

Additionally, the techniques above enable distribution of service instructions (or configuration rules) to the appropriate group of network elements (network access devices). By distributing the network services data plane over each port of the access devices, SEN enables a per-port service model, rather than a standalone appliance model (e.g., for subscription-based services). Leveraging this, a system of established services as well as new and value-added services can be built by a collection of industry partners. SEN is an organic support platform, allowing new services to easily phase into an existing network, thus providing a new architectural approach to networks and the tools made available therein.

Moreover, contrary to certain implementations of the service insertion architecture (SIA), network services are available regardless of user mobility within the network. Further, by pushing part of the service intelligence/performance to the edge of the network, performance bottlenecks found in the network core and scalability problems are substantially alleviated. That is, another advantage of SEN is that it allows the service engines to scale. As noted, while SIA eases configuration burdens and makes service deployment independent of the network topology, it does not ease the data path load on the service engine (the service devices). With SEN the service engine (e.g., a firewall) can distribute its service to the access devices to stop redirecting certain flows (e.g., after seeing enough of the flow to make a classification or service decision), thus lessening the data path load on the firewall leaving it free to do work that only it is capable of performing (e.g., the "slow path" operations).

While there have been shown and described illustrative embodiments of a service enabled network, it is to be understood that various other adaptations and modifications may be made within the spirit and scope of the embodiments herein. In particular, while the foregoing description has been directed to specific embodiments, it will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Further, certain known or future services and/or features (such as those that may or may not use different protocols) may be used in a SEN without their specific mention herein, and those mentioned herein are examples. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a service enabled network (SEN) controller from a control plane of a network service device configured to provide one or more network services for traffic in a computer network, service instructions for the one or more network services to be applied to traffic in the computer network;
   caching the service instructions at the SEN controller;
   receiving registrations at the SEN controller from one or more network access devices, the registrations having an indication of network service capabilities of the corresponding network access devices;
   determining, by the SEN controller, at least one network access device, from among the one or more network access that is able to implement the one or more network services based on the registrations, the one or more network access devices being switches or routers located at a perimeter of the computer network and that provide access to the computer network to one more attached devices; and
   distributing the service instructions from the SEN controller to the at least one network access device for distributed implementation of the network services.

2. The method as in claim 1, further comprising:
   receiving, at the control plane of the network service device, one or more service instructions for the one or more network services; and
   transmitting, by an application programming interface (API) of the network service device, the service instructions for the network services to the SEN controller.

3. The method as in claim 1, further comprising:
   receiving, by an application programming interface (API) of one of the network access devices, the service instructions; and
   implementing, by a data plane of the receiving network access device, one or more network services as directed by the service instructions on traffic transmitted between devices attached to the receiving network access device and the computer network.

4. The method as in claim 1, further comprising:
classifying network access devices into groups based on the registration information; and
determining a particular set of service instructions for distribution to a particular corresponding group of network access devices.

5. The method as in claim 1, wherein the registrations further have an indication of topological attributes of the corresponding network access devices.

6. The method as in claim 1, wherein distributing comprises:
multicasting the service instructions.

7. The method as in claim 1, further comprising:
maintaining a keepalive protocol between the SEN controller and each of the network service device, and the one or more network access devices.

8. The method as in claim 1, further comprising:
learning of a new network access device in the computer network by the SEN controller;
and in response distributing the service instructions from the SEN controller to the new network access device for implementation of the network services at a data plane of the new network access device.

9. The method as in claim 1, wherein the network services are selected from a group consisting of: firewall services; intrusion detection services; intrusion prevention services; distributed measurement services; access control list services; identity-based access services; server load balancing services; file system virtualization services; wide area application services; content scan services; signature-based services; and anomaly detection services.

10. The method as in claim 1, wherein the network services are classified as one of either fast path services or slow path services, the method further comprising:
performing fast path services at the network access devices; and
forwarding traffic requiring slow path services from a network access device to an appropriate network service device for performance of the corresponding slow path service.

11. An apparatus, comprising:
a network interface including circuitry configured to communicate over physical links with a service enabled network (SEN) controller in a computer network, wherein the SEN controller is configured for receiving registrations from one or more network access devices, the registrations providing an indication of network service capabilities of the corresponding network access devices;
a control plane configured to provide one or more network services for traffic in the computer network and to receive service instructions for the network services; and
an application programming interface (API) configured to transmit the service instructions for the network services to the SEN controller, wherein the SEN controller distributes the service instructions to the one or more network access devices for distributed implementation of the network services at data planes of the one or more network access devices, the one or more network access devices being switches or routers located at a perimeter of the computer network and that provide access to the computer network to one more attached devices.

12. The apparatus as in claim 11, wherein the API is further configured to convert the service instructions prior to transmission to the SEN controller.

13. The apparatus as in claim 11, further comprising:
a data plane configured to receive traffic from the computer network.

14. The apparatus as in claim 13, wherein the network services are classified as one of either fast path services or slow path services, wherein the data plane is further configured to receive traffic requiring slow path services from a network access device for performance of the corresponding slow path service, the control plane further configured to perform the corresponding slow path service on the traffic.

15. The apparatus as in claim 11, wherein the network services are selected from a group consisting of: firewall services; intrusion detection services; intrusion prevention services; distributed measurement services; access control list services; identity-based access services; server load balancing services; file system virtualization services; wide area application services; content scan services; signature-based services; and anomaly detection services.

16. The apparatus as in claim 11, wherein the control plane is further configured to classify network access devices into groups and specify a particular group of network access devices to receive a particular set of distributed service instructions from the SEN controller.

17. An apparatus, comprising:
one or more network interfaces, at least one of the network interfaces including circuitry configured to communicate over physical links with a service enabled network (SEN) controller in a computer network, and at least one of the network interfaces configured to allow access to the computer network for one or more attached devices located beyond a perimeter of the computer network;
a data plane configured to control transmission of traffic between the attached devices and the computer network over the one or more network interfaces; and
an application programming interface (API) configured to receive, from the SEN controller in the computer network, service instructions for one or more network services as received by the SEN controller from a network service device control plane in the computer network, wherein the API is further configured to instruct the data plane to implement the network services on the traffic as directed by the service instructions, and
wherein the API is further configured to communicate registrations with the SEN controller, the registrations having an indication of network service capabilities of the data plane.

18. The apparatus as in claim 17, wherein the data plane is further configured to forward traffic requiring a network service for which the data plane is not capable of implementing to a corresponding network service device that is capable of implementing the network service.

19. The apparatus as in claim 17, wherein the registrations further have an indication of topological attributes of the data plane.

20. The apparatus as in claim 17, wherein the API is further configured to, in response to the apparatus coming online, notify the SEN controller of being online, and acquire the service instructions for one or more network services from the SEN controller in response.

21. The apparatus as in claim 17, wherein the API is further configured to convert the received service instructions into configuration rules for the data plane.

22. The apparatus as in claim 17, wherein the network interface configured to communicate with the SEN controller and the network interface configured to allow access to the computer network for one or more attached devices are a same physical network interface.

23. A system, comprising:
- a service enabled network (SEN) controller in a computer network, the SEN controller having a processor and one or more network interfaces, wherein the SEN controller is configured for receiving registrations from one or more network access devices, the registrations identifying network service capabilities of the corresponding network access devices;
- a control plane for a network service device configured to provide one or more network services for traffic in the computer network and to receive service instructions for the network services;
- a data plane for each of the one or more network access devices configured to control transmission of traffic between the computer network and devices attached to the computer network via the network access devices, the one or more network access devices being switches or routers located at a perimeter of the computer network and that provide access to the computer network to one more attached devices; and
- wherein the SEN controller is configured to distribute the service instructions for the network services from the control plane to the one or more data planes for distributed implementation of the network services of the network service device control plane at the one or more data planes of the one or more network access devices.

24. The system as in claim 23, wherein a service enabled perimeter of the computer network is defined by the network access devices.

25. The system as in claim 23, wherein the network services are applicable within at least one of a data link layer, a network layer, a transport layer, a session layer, a presentation layer, or an application layer of the computer network.

* * * * *